United States Patent [19]
Lin et al.

[11] Patent Number: 5,440,713
[45] Date of Patent: Aug. 8, 1995

[54] M-WAY N-PORT PAGED-INTERLEAVED MEMORY SYSTEM

[75] Inventors: Chin-Lung Lin; Ming-Shia Yeh, both of Yunlin; Chin-Sheng Tsao, Taipei; Pey-Horng Shiue, Changhua City, all of Taiwan

[73] Assignee: Industrial Technology Research Institute, Hsinchu, Taiwan

[21] Appl. No.: 891,839

[22] Filed: May 29, 1992

[51] Int. Cl.⁶ .............................................. G06F 12/02
[52] U.S. Cl. ............................... 395/485; 364/DIG. 1; 364/228.7; 364/230.1; 364/242.7
[58] Field of Search ............... 395/200, 400, 425, 325; 364/200 MS File, 900 MS File

[56] References Cited
U.S. PATENT DOCUMENTS

| | | | |
|---|---|---|---|
| 4,214,304 | 6/1980 | Shimizu et al. | 395/425 |
| 4,858,107 | 8/1989 | Fedele | 395/425 |
| 4,924,375 | 5/1990 | Fung et al. | 395/425 |
| 4,928,234 | 5/1990 | Kitamura et al. | 395/425 |
| 5,060,145 | 10/1991 | Scheuneman et al. | 395/425 |
| 5,182,801 | 6/1993 | Asfour | 395/425 |
| 5,214,775 | 5/1993 | Yabushita et al. | 395/200 |
| 5,313,603 | 5/1994 | Takishima | 395/425 |

*Primary Examiner*—David L. Robertson
*Assistant Examiner*—Hiep T. Nguyen
*Attorney, Agent, or Firm*—Meltzer, Lippe, Goldstein et al.

[57] ABSTRACT

The present invention is memory access system suitable for use in a computer system having M memory banks and N masters. The memory access system comprises a separate paged interleaved controller associated with each of the M memory banks. Each of the paged interleaved controllers comprises a bank arbiter and a bank controller. The bank arbiter associated with each memory bank receives requests from the N masters and subjects them to a request-halt protocol. The request-halt protocol executed by each arbiter prioritizes among a plurality of current requests by said masters for the same memory bank. Each arbiter insures that a current request generated by a master will not be granted if the master has a previous request that has not been granted by another arbiter. This insures that the requests of each master are granted in the order in which the requests are made. The request-halt protocol gives a higher priority to current requests specifying a row address which is the same as a valid row address of the previous memory request granted by the arbiter. The request-halt protocol prioritizes among current requests if there is no valid row address of a previous request or if no current request specifies a row address which is the same as the valid row address of the previously granted request.

10 Claims, 5 Drawing Sheets

M-WAY N-PORT PAGED-INTERLEAVED MEMORY SYSTEM

FIELD OF THE INVENTION

The present invention relates to a memory access system for a digital computer system. More particularly, the present invention relates to a memory access system for a computer system having M memory banks and N masters which may be processors or I/O controllers, etc. Such a memory access system may be referred to as a M-way, N-port memory access system. The memory access system of the present invention includes an arbiter for each bank which resolves conflicts when there are simultaneous requests from a plurality of masters for the same memory bank.

BACKGROUND OF THE INVENTION

In a computer system, a memory is usually formed from a plurality of dynamic random access memory (DRAM) chips. DRAMs are generally organized into square arrays. For example, a conventional 256K DRAM has 512 rows and 512 columns, while a conventional 1M DRAM has 1,024 rows and 1,024 columns.

DRAMs have row select lines and column select lines. A DRAM is operated by first selecting a row and then selecting a column. It is a characteristic of conventional DRAMs that prior to selecting a row, the row select line must be pre-charged. If one seeks to access locations which are on different rows, after the first operation, one must wait for the row select line to be pre-charged before one can execute another operation.

However, it is not necessary to pre-charge the column select line before selecting a column. Thus, the amount of time to select a column is considerably less than the amount of time required to select a row. It is possible to execute a relatively slow row select operation and then to quickly select a number of columns from that row. The type of operation wherein a slow row select is followed by several fast column selects is generally referred to as a page mode operation of a DRAM. In the page mode, one can select words within a page much faster than one can select words which are on different pages. Thus, the page mode is one technique which can be utilized to improve DRAM performance.

Another technique which can be utilized to improve DRAM performance involves the use of interleaved memory banks. According to this technique, memory is divided into two or more separate memory banks. Sequential memory locations are stored in sequential memory banks. For example, memory may be divided into two memory banks referred to as "even" and "odd." Sequential memory locations are stored alternately in the even and the odd memory banks. If there is an instruction to read from two sequential memory locations, the first location is read from the first, e.g., the even, memory bank, and, while that bank is being pre-charged, the second location is read from the second, e.g., the odd, memory bank. Thus, because sequential locations will be stored in different memory banks, they can be read very quickly without waiting for an intervening pre-charge cycle.

In U.S. Pat. No. 4,924,375 (Fung et al.), a memory access system is disclosed which combines both page mode operation and interleaved memory in order to achieve high performance. According to this patent, memory is organized into one, two, or four memory banks. Furthermore, each of the memory banks is divided into pages each of which comprises a single row with 2K columns per row. Sequential pages are interleaved among the memory banks so that memory accesses which are a page apart will be to two different memory banks. Sequential accesses to locations on the same page omit the pre-charge cycle, thus speeding up the memory cycle. Sequential accesses to separate memory banks are likewise speeded up since there is no need to wait for the completion of a pre-charging cycle before initiating the next access.

Thus, the memory system disclosed in U.S. Pat. No. 4,924,375 employs both page mode and interleaved memory in order to improve performance of the computer. However, this known memory system has certain limitations. In particular, the memory system disclosed in U.S. Pat. No. 4,924,375 has only four memory banks. It is not easily adaptable to a computer having an arbitrary number of memory banks. Furthermore, this known memory system is only suitable for use in a computer having a single master or microprocessor. If used in conjunction with a computer having multiple masters, additional bank-conflict states may be introduced in the event two masters attempt to access the same memory bank at the same time. There is no disclosure in U.S. Pat. No. 4,924,375 for resolving such bank-conflict states.

Accordingly, it is an object of the present invention to provide a memory access system which is suitable for use in a computer having a plurality of memory banks and a plurality of masters, for example, microprocessors.

It is a further object of the invention to provide a memory access system suitable for use in a computer having M (M>1) memory banks and N (N>1) masters, which memory access system employs page mode and interleaved memory for enhancing performance.

It is yet another object of the present invention to provide a memory access system suitable for use in a computer having M memory banks and N masters, which memory access system provides means for resolving bank-conflict states when several masters simultaneously request access to the same memory bank.

It is yet another object of the present invention to provide a memory access system for use in a computer having M memory banks and N masters which memory access system ensures that requests for access to memory by a particular master are satisfied in First-In-First-Out order.

SUMMARY OF THE INVENTION

In accordance with the present invention, a memory access system suitable for use in a computer having M memory banks and N masters is disclosed. Illustratively, the memory banks have an interleaved organization. The memory access system comprises a separate paged interleaved controller associated with each of the M memory banks. Each of the paged interleaved controllers comprises a memory bank arbiter and a memory bank controller. The bank arbiter associated with each memory bank receives requests from the N masters and subjects them to a request-halt protocol. The request-halt protocol executed by each arbiter prioritizes among a plurality of current requests by said masters for the same memory bank. Each arbiter insures that a current request generated by a master will not be granted if the master has a previous request that has not been granted by another arbiter. This insures that the requests of each master are granted in the order in which the requests are made. The request-halt protocol gives a higher priority to current requests specifying a row address which is the same as a valid row address of the previous request granted by the arbiter. The request-halt protocol prioritizes among current requests if there is no valid row address of a previous request or if no current request specifies a row address which is the same as the valid row address of the previously granted request.

DETAILED DESCRIPTION OF THE PREFERRED EMBODIMENT

Figure 1:
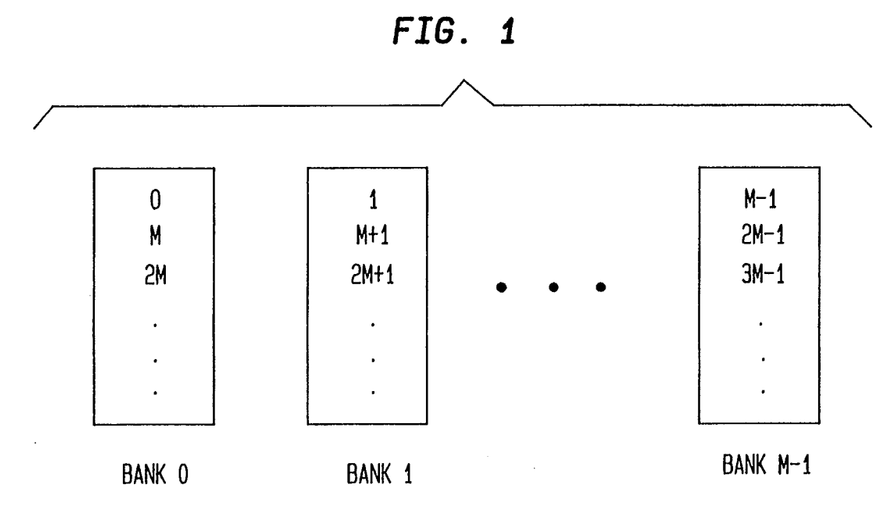
FIG. 1 is a schematic diagram showing how memory is organized in accordance with the present invention.

Referring first to FIG. 1, memory in the present invention is organized into M memory banks, designated Bank 0 to Bank M−1. The number of memory banks is arbitrary. In general, the memory banks comprise DRAM chips, for example, 256K DRAM chips or 1M DRAM chips which are commonly used. Illustratively, memory locations are interleaved among the M memory banks, this means that consecutive locations are stored in consecutive memory banks in a round-robin fashion.

In accordance with the present invention, each memory bank has a Paged-Interleaved DRAM Controller ("PIDRC") associated with it. Each PIDRC receives requests from the N masters for access to its associated memory bank. Each PIDRC arbitrates the requests from the N masters to determine which requests are accepted and which are ignored and generates control signals which enable winning requests to access the associated memory bank. To maximize performance of the memory system, each PIDRC employs a request-halt protocol. By means of this request-halt protocol, the PIDRC associated with a particular memory bank prioritizes the requests made to its associated memory bank and determines which ones will be accepted. The request-halt protocol insures that the requests of a master are carried out in a First-In-First-Out order.

Furthermore, the request-halt protocol is designed to give priority to requests which specify a row address that is the same as the row address of the last request accepted by that PIDRC. In other words, priority is given to consecutive requests which have the same row address. This saves the time for pre-charging the row select line as discussed above.

Figure 2:
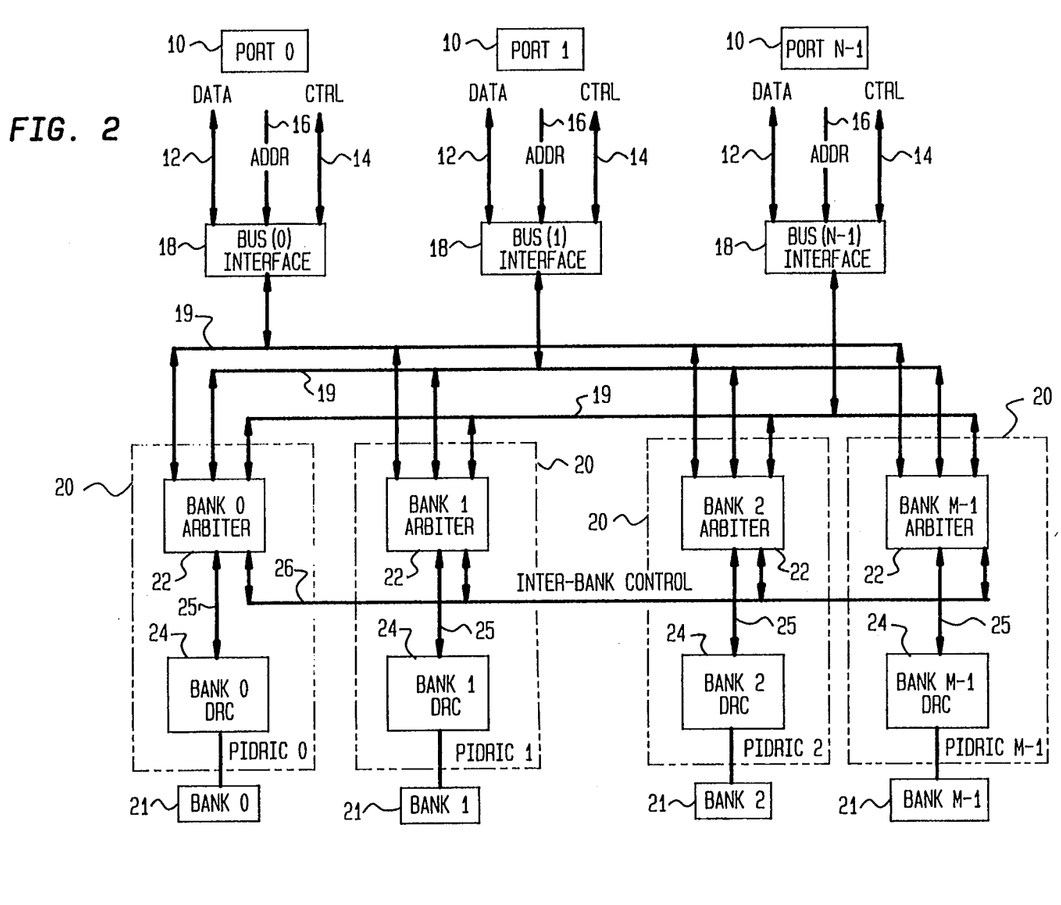
FIG. 2 is a block diagram showing the M-way, N-port paged interleaved memory access system of the present invention.

Referring now to FIG. 2, a block diagram of the inventive M-way N-port Paged-Interleaved Memory System is depicted. FIG. 2 shows the interconnection of the N masters or ports 10 with the M PIDRCs 20. Each PIDRC 20 is in turn connected to an associated memory bank 21. Each of the N masters or ports 10 sends and receives data and control signals along the lines 12 and 14. A third line 16 from each of ports 10 carries an address word which specifies, the selected memory bank, the selected row address, and the selected column address. These signals are conveyed to the M PIDRCs 20 via the bus interfaces 18 and the buses 19. The bus interfaces 18 and buses 19 route requests specifying a particular memory bank 21 to the PIDRC 20 associated with that memory bank.

As shown in FIG. 2, each PIDRC 20 comprises an arbiter 22 and a DRAM controller (DRC) 24 which are connected to each other by a line 25. In the memory access system of FIG. 1, the arbiters 22 communicate with each other using an interbank control bus 26.

Each arbiter 22 in each PIDRC implements a request-halt protocol which determines whether an address request by a particular master will be accepted or ignored. The request-halt protocol is based on the requested row address, the row address of the last request accepted by the PIDRC, and the arbitration status of the other PIDRCs.

A request-halt protocol suitably implemented individually in each of the arbiters 22 comprises the following set of logical steps.

1. For each master i, i=0,1, ..., N−1, set r(i) equal to 1 if the master i has a current request for the memory bank associated with the arbiter,
2. If a previous request by the master i is not granted (i.e., is ignored) by this arbiter or another arbiter, set I(i) equal to 1,
3. Set the masked master request signal mr(i) of the master i to r(i) and I(i) and nht(i)

A request of master i with mr(i)=1 may be described as a valid request. As indicated below, the signal nht(i) is set to 1 by this arbiter if this arbiter has rejected a previous valid request of the master i. Thus, the masked master request mr(i) Of a master i is set to 1 if the master i has a current request and the master i does not have a previous valid request which was ignored by another arbiter. This insures that requests of the master i are handled in a first-in, first-out order.

4. Compare raddr(i), the row address specified in the current request of master i, and Laddr, the valid row address of the last request granted by this arbiter and set e(i)=1 if raddr (i)=Laddr.
5. Set the page hit condition of the master i, ph(i), to 1 if
    (a) mr(i) and e(i)=1 (This is how the protocol gives priority to current requests which specify a row address equal to the valid row address of the last granted request) or
    (b) mr(i) and $\overline{mby}$=1 (where mby is a signal which indicates the busy status of the memory controller associated with this arbiter. If mby=0, the row address of the last request granted by this arbiter is not valid, and the page hit condition of all current valid requests is set to 1) or
    (c) A request with a ph(i) set equal to 1 may be viewed as a request eligible for acceptance. The net result of step 5 is to give a preference to valid requests which specify an address raddr(i) equal to Laddr.
6. This is a step which prioritizes among the requests with ph(i)=1. Thus, an acceptance condition a(i) is set equal to 1 for one master i and is set equal to zero for the remainder of the masters. One possible rule is to give master i=0 the highest priority and master N−1 the lowest priority. Thus:

a(0)−1 if ph(0)=1, $a(i) = 1$ if $ph(i) = 1$ and $a(j) = 0$ for $i > 1, j < i$

7. Set the halt condition $ht(i) = mr(i)$ and $a(i)$ (The halt condition $ht(i)$ is 1 when a valid request of master i is not accepted by this arbiter).
8. Latch the $ht(i)$ to generate $nht(i)$ for the next arbitration cycle.
9. The ignore signal $I(i)$ for a master i for the next arbitration cycle is generated from the halt signals $ht(i)$ for the master i. There are M arbiters labeled $0, 1, \ldots, M-1$, each associated with a corresponding memory bank $0, 1, \ldots, M-1$. For each arbitration cycle, each arbiter m outputs a halt signal $ht_m(i)$ for each master i, where m is an index identifying the arbiter m, $m = 0, 1, \ldots, M-1$. If in one arbitration cycle, for a master i, the signal $ht_m(i)$ is asserted for any value of m, it means that a valid request from the master i has been ignored by one of the arbiters. This means that in the next arbitration cycle $I(i)$ will be set equal to 1.

Figure 3:
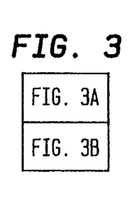
FIG. 3 is a block diagram showing a bank arbiter in accordance with the present system.
Figure 3A:
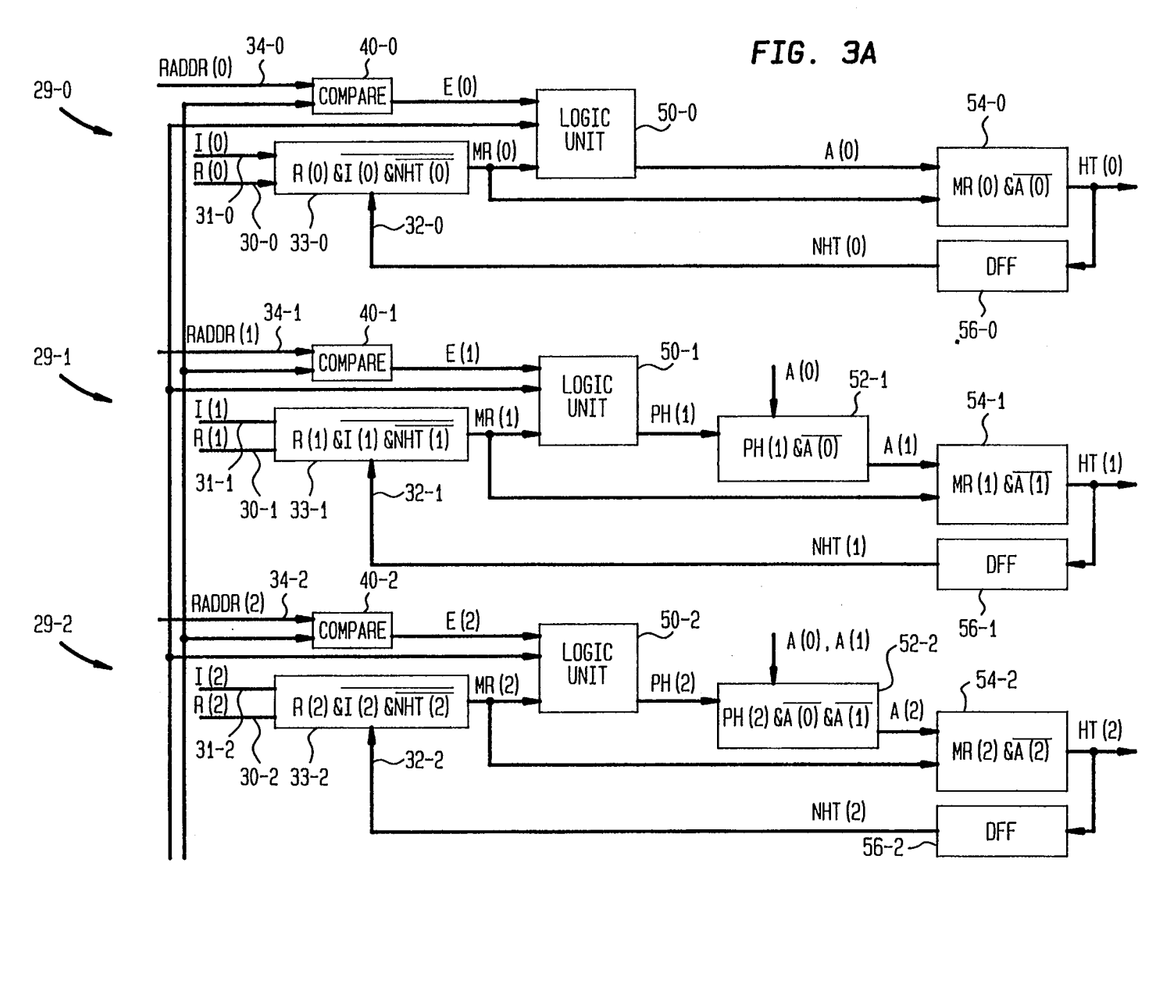
Figure 3B:
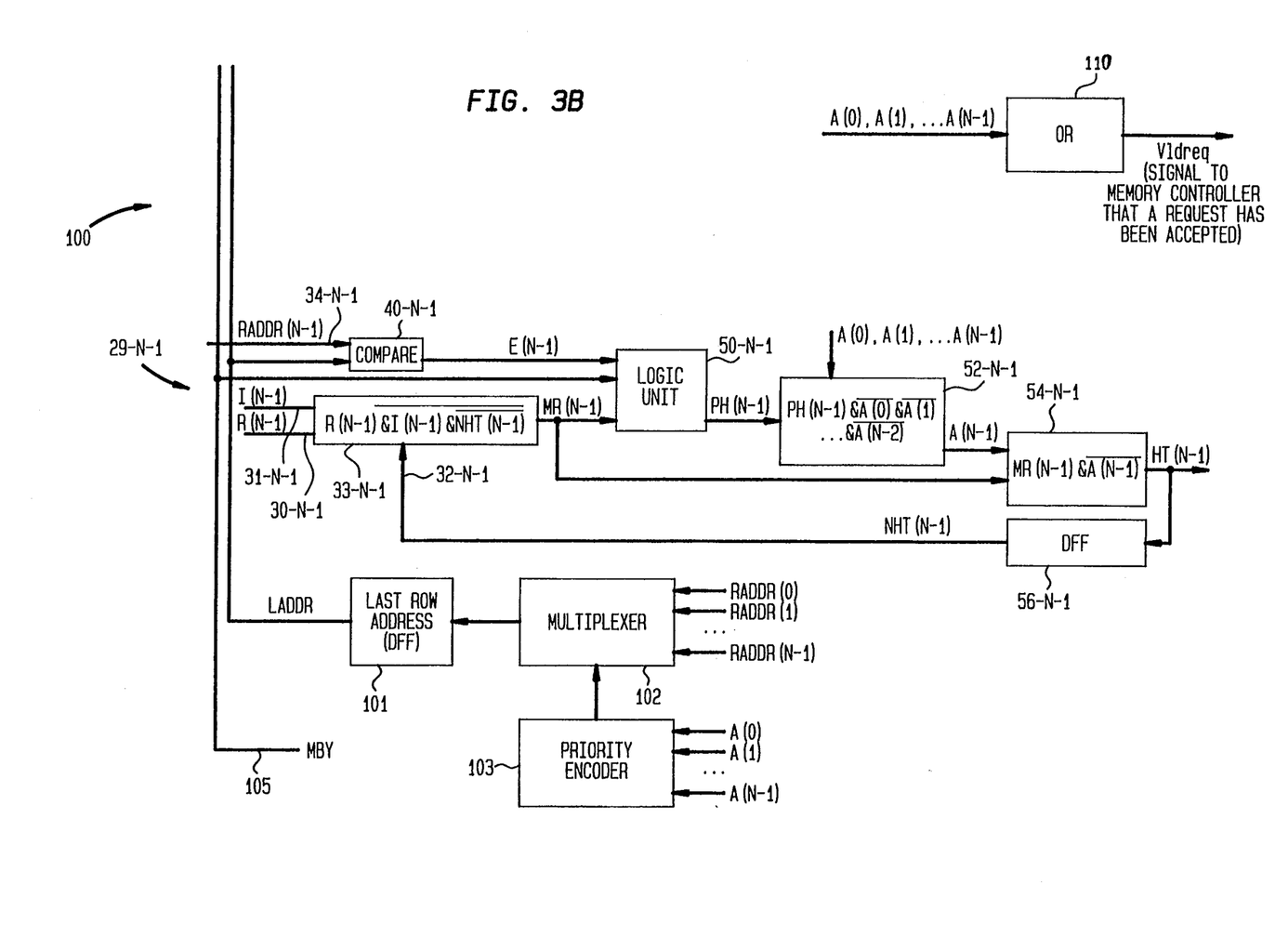

FIG. 3 is a block diagram of a circuit 100 contained in each of the arbiters 22 of FIG. 2 for implementing the request-halt protocol described above. The circuit 100 comprises a processing unit 29-i for each master i, $i = 0, 1, \ldots, N-1$. Each processing unit 29-i receives the $r(i)$ signal on line 30-i indicating if the master i has a current request. The signal $I(i)$ is received on line 31-i. As indicated above, this signal indicates if the previous valid request of the master i has not been granted by this arbiter or another arbiter. The signal $nht(i)$ appears on line 32-i. The derivation of this signal in the circuit 100 of FIG. 3 is discussed in detail below.

The signals $r(i)$, $I(i)$ and $nht(i)$ are inputted to the logic unit 33-i which outputs the signal $mr(i)$. As indicated above, the signal $mr(i)$ indicates if a request of the master is valid. As used herein, a request of a master i is valid if the previous valid request of the master i has not been rejected by another arbiter.

A row address $raddr(i)$ specified in the current request of the master i is received at each processing unit 29-i on the line 34-i.

The row address Laddr of the last request granted by this arbiter (i.e, the arbiter incorporating the circuit 100) is stored in the register 101. This address is generated using the multiplexer 102 and the priority encoder 103. The row addresses $raddr(i)$ of all of the requests in the last arbitration cycle are inputted to the multiplexer 102. The acceptance signals $a(i)$ of the requests in the last arbitration cycle are inputted into the priority encoder 103. Only one acceptance signal $a(i)$ from the last arbitration cycle is asserted (i.e., is logic one) indicating acceptance of the corresponding request. This information is utilized by the encoder 103 to output a signal to the multiplexer 102 which causes the row address $raddr(i)$ specified in the accepted request of the last arbitration cycle to be stored as the quantity Laddr in the register 101.

The signal mby is present on line 105. The signal mby is generated by the memory bank controller corresponding to the arbiter circuit 100. The signal mby is asserted when the bank controller is busy and indicates if the address Laddr is valid. If mby is not asserted (i.e. is logic 0) then the value of Laddr in the register 101 is not valid.

In the circuit 100 of FIG. 3, each processing unit 29-i includes a comparator 40-i. The comparator 40-i compares the row address $raddr(i)$ of the current request of master i on line 34-i with Ladddr stored in the register 101. Each comparator 40-i outputs the signal $e(i)$ which is asserted when $raddr(i) = Laddr$.

Each processing unit 29-i includes a logic unit 50-i. The logic unit 50-i outputs a page hit signal $ph(i)$ for a request of the master i. The page hit signal $ph(i)$ indicates a request which is eligible for acceptance. As indicated above, a request of master i is eligible for acceptance, i.e., $ph(i)$ is asserted, if (1) $e(i)$ and $mr(i)$ is asserted or
(2) mby and $mr(i)$ is asserted It is then necessary to prioritize among the requests whose page hit signal has been asserted and choose one request which is accepted. Thus, an acceptance signal $a(i)$ is either asserted or non-asserted for each request of master (i). In the circuit 100 of FIG. 3, priority is given to the current request of the lowest numbered master i whose page hit signal $ph(i)$ is asserted.

Thus, in the circuit 100 of FIG. 3, if $ph(0)$ is asserted, then $a(0)$ is asserted and the request of master $i = 0$ is granted. To generate an acceptance signal $a(i)$, $i = 1, 2, \ldots, N-1$ the processing units 29-1, 29-2, ..., 29-N-1 each include a logic unit 52-1, 52-2, ..., 52-N-1. Each of the logic units 52-i, $i = 1, 2, \ldots, N-1$ asserts $a(i)$ if $ph(i) = 1$ and $a(j) = 0$ for $j < i$.

The acceptance signals $a(i)$ are utilized to control the transmission of the accepted request to the corresponding DRAM controller 24 (see FIG. 2). The circuit 100 includes the OR-circuit 110. The OR-circuit 110 receives as an input the signals $a(i), i = 0, 1, \ldots, N-1$ and outputs a signal vldreq to the DRAM controller when one of the signals $a(i)$ is asserted.

Each processing unit 29-i also includes a logic unit 54-i. The logic unit 54-i receives as inputs $mr(i)$ and $a(i)$ and outputs $ht(i)$. The signal $ht(i)$ is then latched in a latch 56-i to output the signal $nht(i)$ for the next arbitration cycle. The signals $ht(i)$ are combined in the manner discussed above to generate the ignore signals $I(i)$ for the next arbitration cycle.

A refresh circuit (not shown) is implemented as one of the accessing masters, and is always given the highest priority, i.e., the refresh circuit is designated as master $i = 0$. A DRAM refresh circuit is in each DRAM controller 24 and is a hidden refresh. The hidden refresh need not specify a row address.

Figure 4:
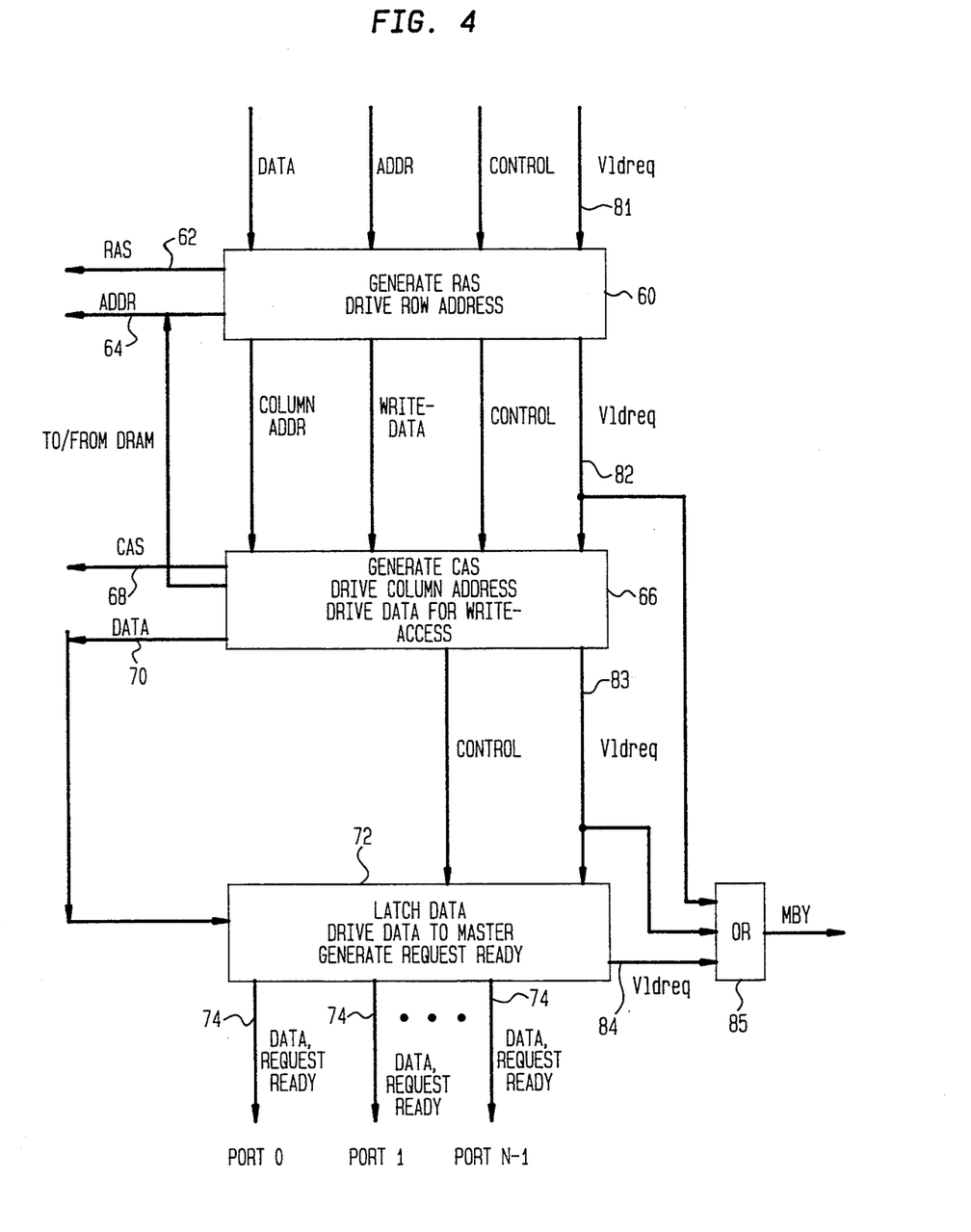
FIG. 4 is a block diagram showing a bank controller in accordance with the present invention.

The DRAM controllers 24 (see FIG. 2) generate DRAM control signals and are implemented as three-stage pipelines. A block diagram of a conventional DRAM controller 24 is shown in FIG. 4. The first stage 60 receives the winning request on the data, address and control lines 61 from a corresponding arbiter 22, activates the RAS_(row address strobe) line 62 and drives the DRAM address line 64 with the row address if a new row has been selected. The second stage 66 activates the CAS_(column address strobe) line 68 and drives the DRAM address line 64 with a column address and data line 70 with write-data for a write access. The third stage 72 latches read data on the DRAM data line 70 in a read access operation and drives the latched data to the data bus 74 of the master that generated the request.

The signal vldreq is transmitted from the arbiter to the stage 60 on the line 81. From the stage 60, the signal vldreq is transmitted via the line 82 to the stage 66. From the stage 66, the signal vldreq is transmitted via the line 83 to the stage 72 and is outputted by the stage 72 on line 84. The OR-circuit 85 outputs the mby signal if vldreq is asserted on line 82, 83 or 84 indicating one of the stages of the DRAM controller is busy.

In summary, a memory access system suitable for use in a computer system having N masters and M memory banks has been described. The memory access system employs both page mode operation and interleaved memory techniques. Furthermore, the memory system includes an arbiter for each memory bank. Each arbiter executes a request-halt protocol to arbitrate requests by the N masters giving priority to requests which specify the same row address as the last request granted by the arbiter. The request-halt protocol also ensures that requests from a particular master will access the memory system in First-In-First-Out order.

While the invention has been described by reference to specific embodiments, this was for purposes of illustration only. Numerous alternative embodiments will be apparent to those skilled in the art and are considered to be within the spirit and scope of the invention.

We claim:

1. A memory access system wherein N masters can access M memory banks comprising:
   a plurality of controllers, including one controller corresponding to each of said M memory banks, each of said controllers comprising a bank controller and a bank arbiter, each of said bank arbiters comprising:
   (1) means for receiving a plurality of current memory access requests from said N masters, each of said current memory access requests specifying a row address in one of said memory banks which said one memory bank corresponds to said controller of said bank arbiter,
   (2) means for asserting a first signal for each one of said current memory access requests if one of said N masters issued said current memory access request, unless a previous memory access request issued by said one master was ignored by another one of said bank arbiters,
   (3) means for asserting a second signal for each one of said current memory access requests if said row address of said current memory access request issued from said one master equals a row address of the memory access request most recently granted by said bank arbiter,
   (4) means for asserting a third signal for each one of said current memory access requests for which either of said first and second signals is asserted, and
   (5) means for prioritizing among said current memory access requests issued by said one master for which said third signal is asserted, said prioritizing means also for generating a fourth signal for one of said current memory access requests indicating acceptance of said one current memory access request.

2. The memory access system of claim 1 wherein each bank arbiter further comprises means for generating a halt signal for each one of said memory access requests that is rejected by said bank arbiter, said halt signals being used to generate said first signals.

3. The memory access system of claim 1 wherein said M memory banks are interleaved.

4. The memory access system of claim 1 wherein each bank controller comprises means for generating a fifth signal with a first value when a row address for a second previous memory access request is valid and for generating said fifth signal with a second value when said row address for said second previous memory access request is invalid, wherein said fifth signal with said second value prevents issuance of said second signal.

5. An electronic processing system comprising
   a plurality of masters,
   a plurality of memory banks,
   a plurality of controllers, including one controller corresponding to each of said memory banks, each controller for receiving current memory access requests issued from said masters for said memory bank corresponding to said controller,
   each of said controllers including an arbiter for prioritizing among said current memory access requests, and each of said arbiters comprising means for preventing one of said current memory access requests generated by one of said masters from being granted if said one master has a previous memory access request that was ignored by another arbiter, said one current memory access request being granted after said previous memory access request has been granted, so that said current and said previous memory access requests of said one master are granted in an order in which said current and said previous memory access requests were issued, and each of said arbiters further comprising means for giving a higher priority to current memory access requests specifying a row address which is identical to a row address of a memory access request previously granted by said arbiter.

6. The electronic processing system of claim 5 wherein each arbiter further comprises means for prioritizing among a plurality of current memory access requests in the absence of a valid row address of a previous memory access request granted by said arbiter.

7. The electronic processing system of claim 5 wherein each arbiter includes means for prioritizing among a plurality of current memory access requests if none of said plurality of current memory access requests have a row address which is identical to a row address of a memory access request previously granted by said arbiter.

8. In a processing system comprising N masters and M memory banks, a method for arbitrating among multiple requests, including current requests and previous requests, generated by said masters for one memory bank comprising the steps of:
   (1) receiving, at an arbitration circuit corresponding to said one memory bank, at least one of said current requests of said multiple requests for said one memory bank,
   (2) asserting a first signal for each one of said current requests received by said arbitration circuit if one of said N masters issued said current request, unless one of said previous requests issued by said one master was ignored by another arbitration circuit corresponding to another one of said memory banks,
   (3) asserting a second signal for each one of said current requests received by said arbitration circuit if a row address of said current request issued from said one master equals a row address of a most recently granted previous request by said one arbitration circuit,
   (4) asserting a third signal for each one of said current requests received by said arbitration circuit if either of said first and second signals is asserted, and
   (5) prioritizing among said current requests received by said one arbitration circuit for which said third signal is asserted by said arbitration circuit and generating a fourth signal for one of said current requests indicating acceptance of said one current request.

9. The method of claim 8 wherein said method comprises the step of communicating to other arbitration circuits corresponding to other ones of said memory banks information identifying masters for whom requests were ignored.

10. In a processing system comprising N masters and M memory banks, a method carried out electronically for arbitrating among multiple requests generated by said N masters for one memory bank comprising the steps of:

(1) for each current request generated by one of said N masters, indicating that said current request is valid unless a previous valid request of said master which generated said current request had been rejected, (2) for each current valid request, indicating that said request is eligible for acceptance
 (a) if a row address specified in said current valid request is equal to a valid row address of a previous request for said one memory bank which was most recently granted,
 (b) in the absence of a valid row address of said most recently granted request for said one memory bank, and (3) prioritizing among said current requests indicated as eligible for acceptance and generating a signal indicating the acceptance of one of said eligible current requests.

* * * * *